United States Patent [19]

Takase et al.

[11] Patent Number: 5,420,859
[45] Date of Patent: May 30, 1995

[54] METHOD OF MODIFYING VIRTUAL PATH CAPACITY

[75] Inventors: Akihiko Takase, Tokyo; Yukio Nakano, Hachioji, both of Japan

[73] Assignee: Hitachi, Ltd., Tokyo, Japan

[21] Appl. No.: 132,918

[22] Filed: Oct. 7, 1993

Related U.S. Application Data

[63] Continuation of Ser. No. 744,264, Aug. 13, 1991, Pat. No. 5,271,005.

[30] Foreign Application Priority Data

Aug. 17, 1990 [JP] Japan .................. 2-215707

[51] Int. Cl.⁶ .......................................... H04L 12/56
[52] U.S. Cl. ......................... 370/60.1; 370/84; 370/95.1
[58] Field of Search ............... 370/53, 54, 58.1, 79, 370/84, 85.7, 95.1, 110.1, 60, 60.1

[56] References Cited

U.S. PATENT DOCUMENTS

| | | | |
|---|---|---|---|
| 4,476,527 | 10/1984 | Clayton | 370/84 |
| 4,965,798 | 10/1990 | Mostafa | 370/79 |
| 5,038,340 | 8/1991 | Ochiai | 370/54 |
| 5,067,127 | 11/1991 | Ochiai | 370/95.1 |
| 5,199,027 | 3/1993 | Barri | 370/60 |
| 5,241,535 | 8/1993 | Yoshikawa et al. | 370/60 |

*Primary Examiner*—Benedict V. Safourek
*Attorney, Agent, or Firm*—Antonelli, Terry, Stout & Kraus

[57] ABSTRACT

A method of modifying a virtual path capacity in a communication network which transfers a first cell in an asynchronous transfer mode between node apparatuses. The first cell has a first virtual path identifier indicative of a virtual path which the first cell passes through. A bandwidth allocated to the virtual path is modified. Notification of the modification of the bandwidth is provided to a node apparatus included in the virtual path by passing a second cell through said virtual path. The second cell has information of the modification and a second virtual path identifier same as the first virtual path identifier. The second cell is received by the node apparatus and a third cell having information of confirmation of reception of the second cell is returned by the node apparatus.

15 Claims, 6 Drawing Sheets

F I G. 6
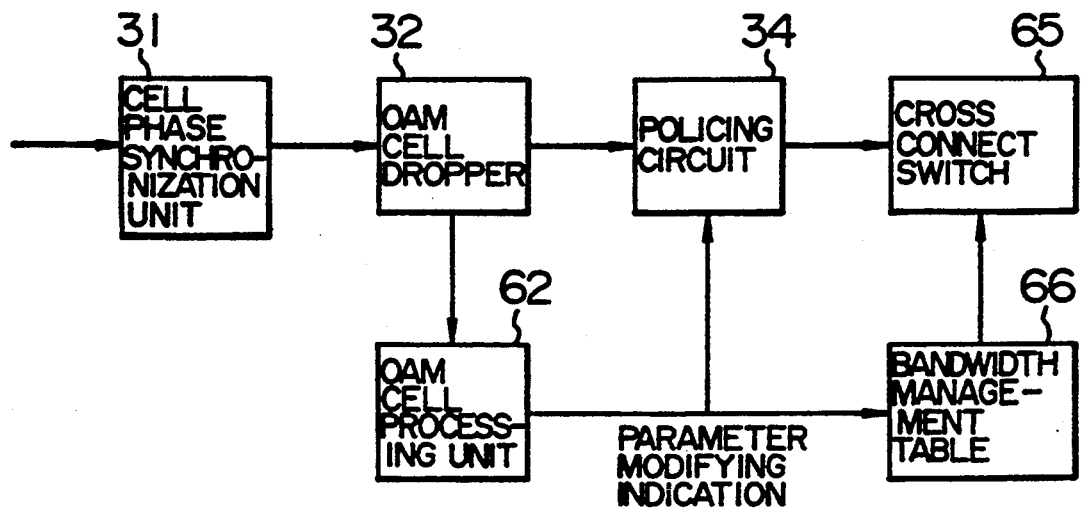
F I G. 7
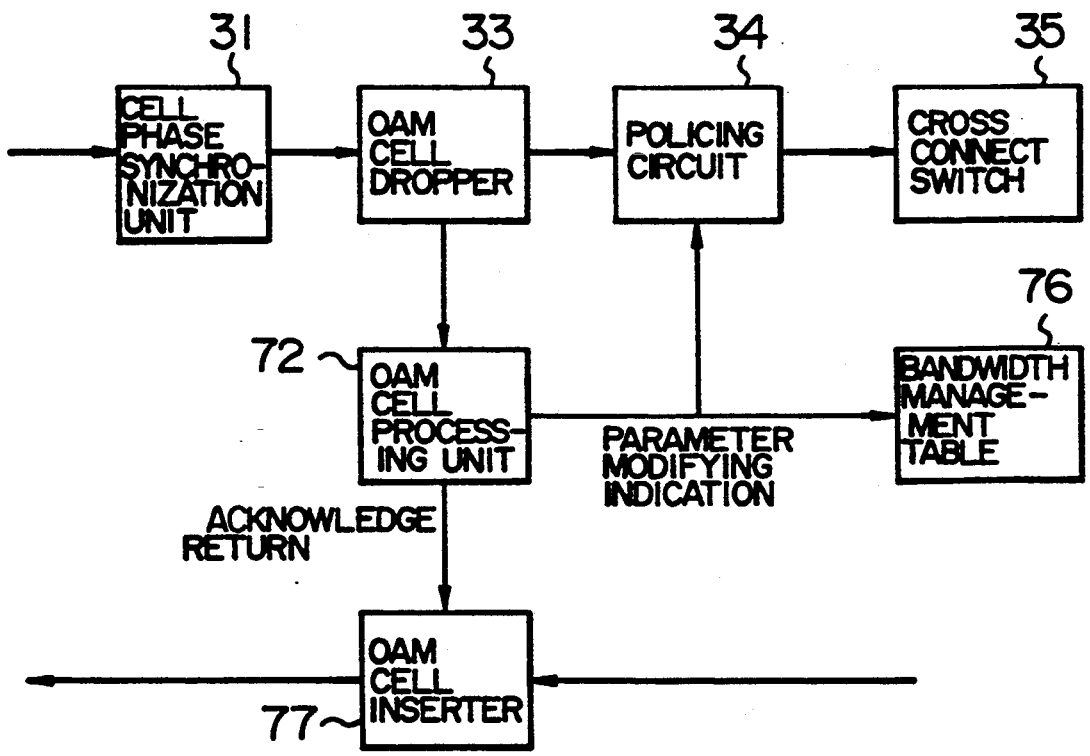

METHOD OF MODIFYING VIRTUAL PATH CAPACITY

This is a continuation of application Ser. No. 07/744,264, filed Aug. 13, 1991, now U.S. Pat. No. 5,271,005.

BACKGROUND OF THE INVENTION

The present invention relates to a method of modifying a capacity of a logical path (a virtual path, hereinafter abbreviated as a VP) in a communication network in an asynchronous transfer mode (hereinafter abbreviated as ATM), and more particularly to a method of notifying a cross connect apparatus which changes over the virtual path in the unit of a cell of indication for modification in case of modifying the capacity of the virtual path.

In a communication network with a conventional synchronous transfer mode (hereinafter abbreviated as STM), change-over of a path has been performed by notifying all of cross connect nodes, where the path to be changed over passes through, of the change-over of the relevant path. Such notice is given by a separate control line from the path. It has been proposed that a similar method may be adopted naturally in an ATM communication network using the STM communication network as an example. FIG. 2 shows such a method. A VP in an ATM is set between switching systems, and a VP management system usually executes modification of the VP capacity based on a VP capacity modification request from the switching system.

A switching system 20a issues a VP capacity modification request to a VP management system 10 where there is a need to modify a VP capacity to another switching system 20b. The VP management system 10 investigates a capacity of a transmission line and a VP capacity set status of a link where the VP passes through, issues admission of VP capacity modification to the switching system 20a and issues indication of modification of the VP capacity at the same time to cross connect systems 30a, 30b and 30c of the passing links if VP capacity modification is possible.

In above-described conventional example, it is required to issue indications of modification from the VP management system 10 through different lines to each of cross connect systems 30a, 30b and 30c, respectively. Since a VP is usually composed of approximately several ten links, it is required to issue indications of modification to several ten cross connects respectively.

SUMMARY OF THE INVENTION

It is an object of the present invention to reduce complexity of notifying a plurality of cross connects of capacity modification individually, and to realize equivalent functions by a more simplified method.

In order to solve the above-described problems, indications of VP capacity modification are given by sending out a cell for operation, administration and maintenance (hereinafter abbreviated as OAM) showing indications of VP capacity modification in the VP in a method according to the present invention.

It is generally possible to achieve the object only by notifying of the same information of a new capacity in a simulcast manner to all the cross connects in modifying the VP capacity. Further, respective cross connects are connected link by link, and it is possible to realize a simulcast function in such a case by relaying the same information link by link.

BRIEF DESCRIPTION OF THE DRAWINGS

FIG. 6 is a block diagram illustrating another embodiment of the present invention.

FIG. 7 is a block diagram illustrating still another embodiment of the present invention.

DESCRIPTION OF THE PREFERRED EMBODIMENTS

Figure 1:
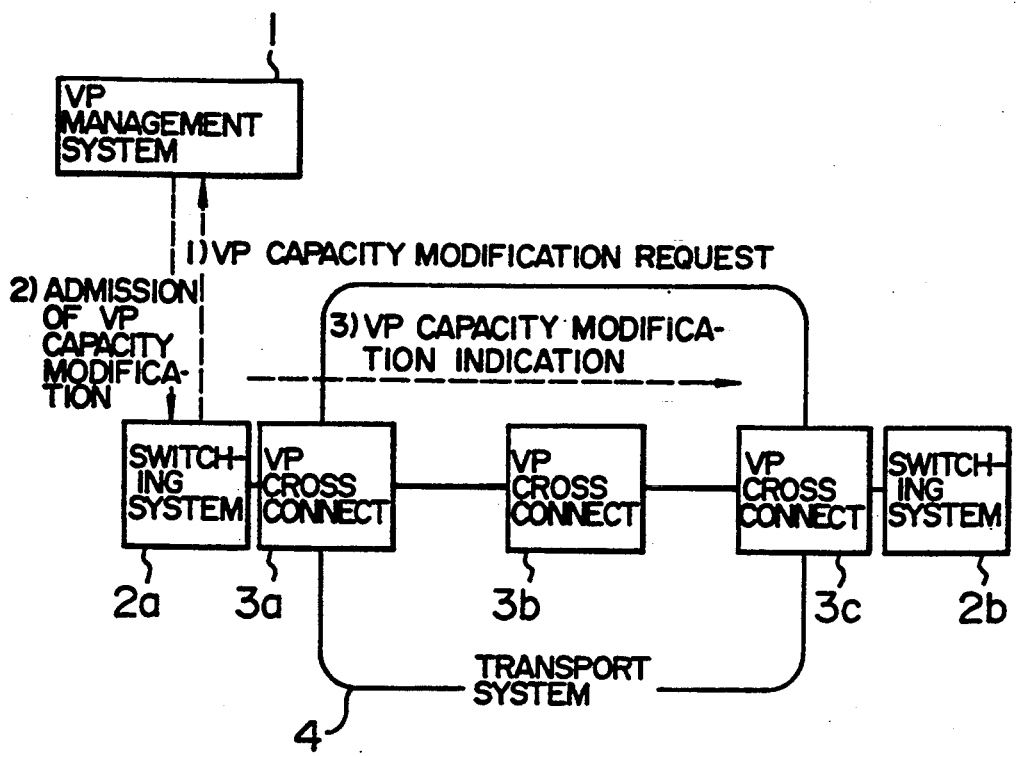
FIG. 1 is a block diagram for explaining a fundamental embodiment of the present invention.
Figure 2:
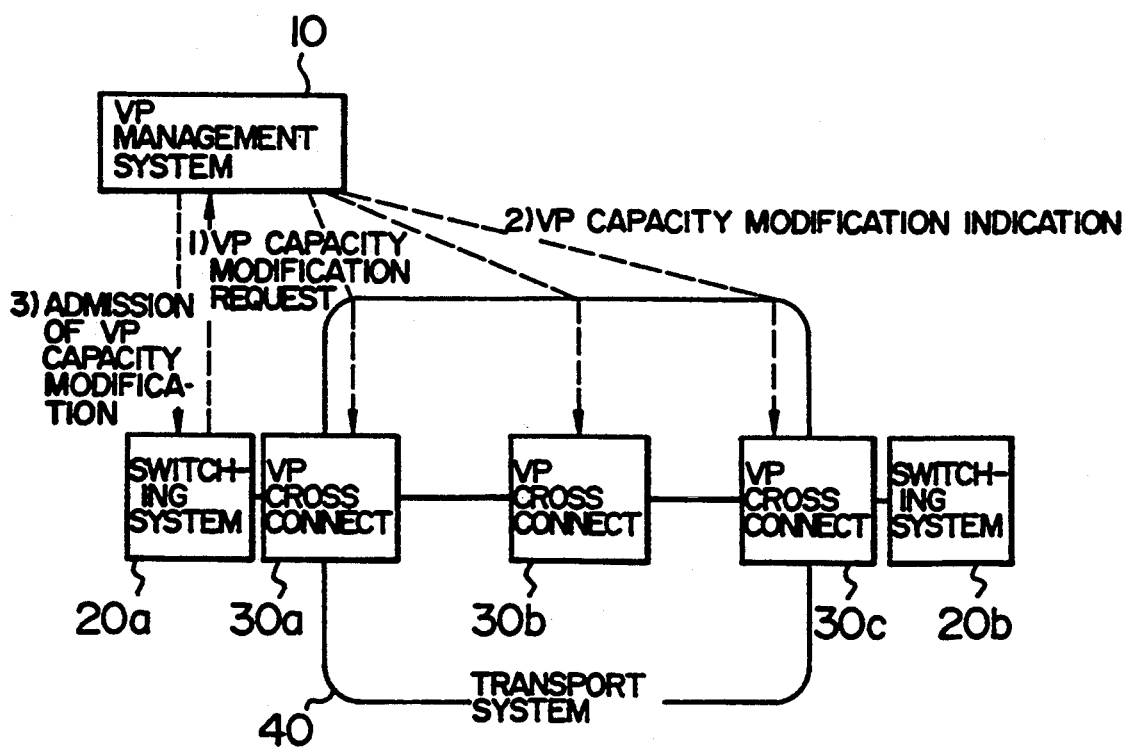
FIG. 2 is a block diagram showing a conventional example.

The embodiments of the present invention will be described hereinafter with reference to the drawings. FIG. 1 is a diagram showing a fundamental embodiment of the present invention.

A switching system 2a issues a VP capacity modification request to a VP management system 1 where there is a need to modify a VP capacity to another switching system 2b. The VP management system 1 investigates a capacity of a transmission line and a VP capacity set status of a link where the VP passes through, and issues admission of VP capacity modification to the switching system 2a if VP capacity modification is possible. The switching system 2a which has received admission of VP capacity modification indicates, by means of an OAM cell having the same VP number as the VP which performs capacity modification, modification of the VP capacity to a cross connect located in the passing route of the VP.

Figure 3:
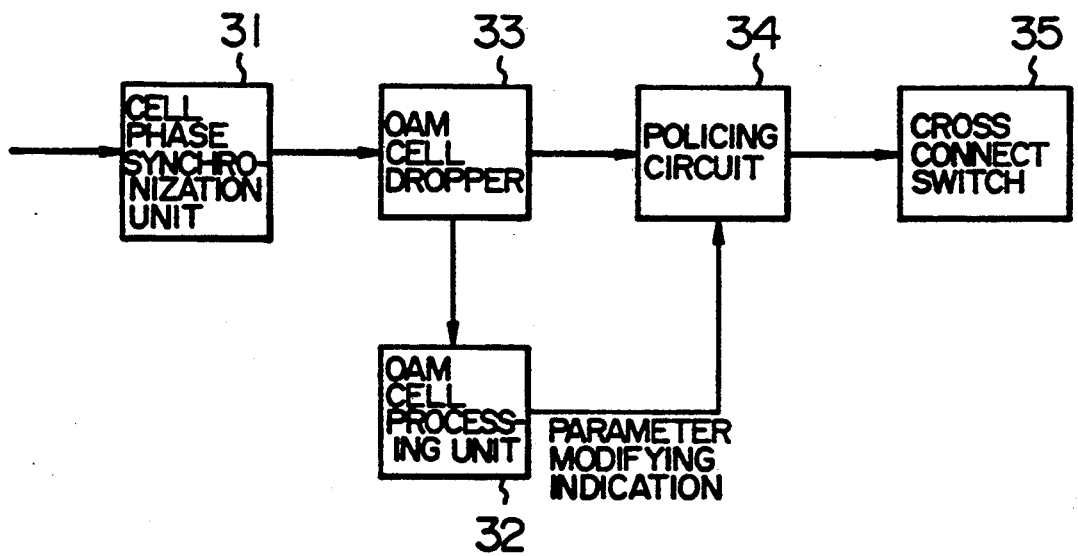
FIG. 3 is a block diagram illustrating a construction of a cross connect on a VP according to the fundamental embodiment.

FIG. 3 is a diagram showing a construction of a cross connect on a VP. As to a cell stream received at a cross connect, a phase of a cell is synchronized with a clock inside the cross connect by means of a cell phase synchronization unit 31. For the synchronized cell stream an OAM cell is dropped by means of an OAM cell dropper 33. The contents of the dropped OAM cell are interpreted by an OAM cell processing unit 32, and the contents are notified to a policing circuit 34. The policing circuit 34 modifies a regulation parameter on the VP capacity based on the notified contents. A VP cell stream which has been applied with regulation is inputted to a cross connect switch 35.

Figure 4A:
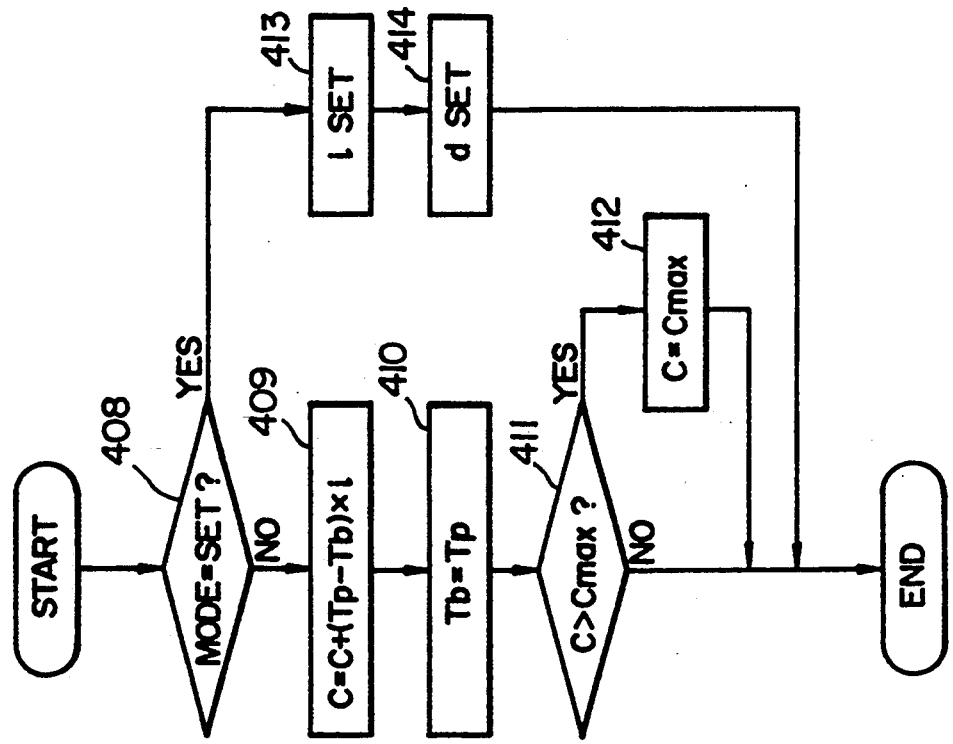
FIGS. 4A and 4B are flow charts illustrating operation of a policing circuit according to the fundamental embodiment.
Figure 4B:
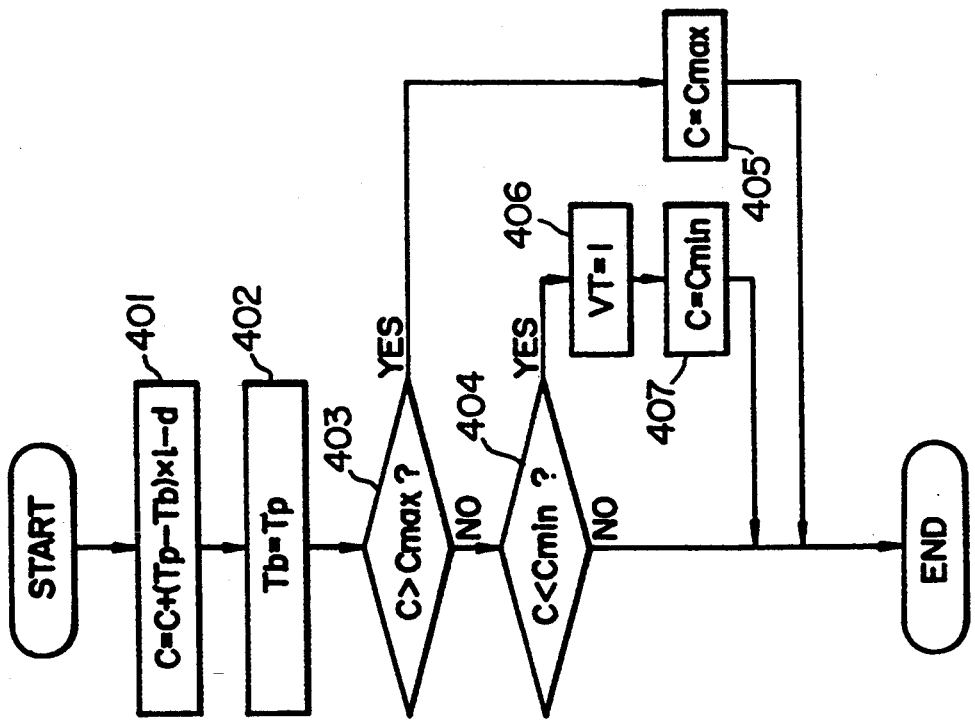

FIGS. 4A and 4B shows flow charts showing the operation of the policing circuit 34. In this method, the time interval for processing one cell is divided into the first half portion and the second half portion, and a received cell is processed in the first half portion. Periodic renewal of a parameter or setting modification of a regulation parameter is performed in the second half portion.

In this method, a count value C and a time stamp Tb showing the last cell receiving time or periodic renewal time are used as parameters showing the VP use status corresponding to a received VP identifier (hereinafter referred-to as VPI), and an increment value i and a decrement value d are used as regulation parameters. A policing characteristic may be changed with the values of regulation parameters (i, d). These parameters are notified from the OAM cell processing unit 32.

At the time of receiving a cell, that which obtained by subtracting the time stamp value Tb from the current time Tp, adding the value which is increased by i times to C, and subtracting d therefrom is adopted as a count value at the time of reception (steps 401, 402). When this value falls between a count value Cmin at the start of regulation and the maximum count value Cmax, the processing is terminated (steps 403, 404). In case that C becomes larger than Cmax, C=Cmax is set (step 405). Further, in case that C becomes smaller than the Cmin, C=Cmin is set, and the cell is sent out to the cross connect switch 35 with a violation tag VT attached thereto (steps 406, 407). The cell attached with the violation tag VT is rejected with priority when cell rejection is required in accordance with the inside congestion status.

Periodic renewal of the count value is performed in the second half of one cell cycle. The VPI which performs periodic renewal is selected in the period of N cells, and that which is obtained by subtracting the time stamp value Tb from the current time Tp and adding the value which is increased by i times to C. In case that C exceeds Cmax, C=Cmax is set (steps 408–412).

When the VPI is in a set mode in the second half of one cell cycle, new values of i and d are entered in a table (steps 413, 414). Namely, the contents notified from the OAM cell processing unit 32 are set in the policing circuit with this timing.

Figure 5:
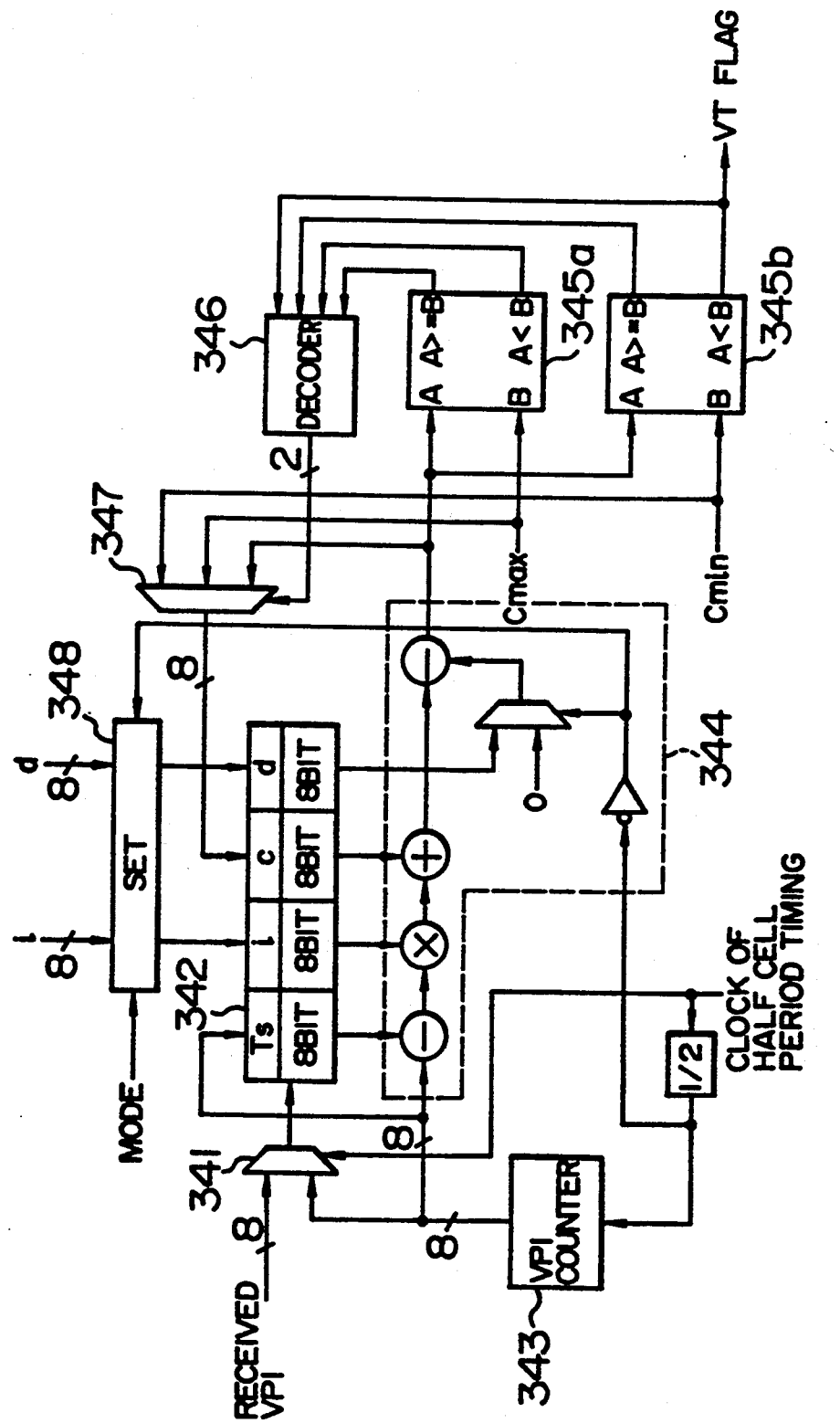
FIG. 5 is a circuit diagram illustrating a construction example of the policing circuit.

FIG. 5 shows a construction example of the policing circuit. In this circuit configuration, the first half cycle and the second half cycle are created by demultiplying the frequency of a clock of half cell period timing in two. A VPI counter 343 creates VPI values in consecutive order in the period of N cells, thus giving the timing of periodic renewal and setting. A selector 341 selects in every half cell period timing with which of a received VPI and a VPI counter accesses as a table memory 342. An operation circuit 344 performs operation shown in FIG. 4 by using the contents of the memory 342. A value Tb of a time stamp is created by utilizing the value of the VPI counter 343. Furthermore, the result of operation is compared with Cmax and Cmin by means of comparators 345a and 345b, and a decoder 346 determines information for renewal of the memory 342 based on the result of the comparison.

The information to be stored in the memory 342 is changed over with a mode change-over circuit 348 at the time of changing over parameters.

A feature of a method of the present embodiment is that it is possible to modify a VP capacity only by notifying policing parameters.

FIG. 6 is a diagram showing another embodiment of the present invention. In this embodiment, a traffic shaping function 66 is added to a cross connect switch, and parameter modifying indication is also notified to the bandwidth management table. The parameters in this case are a VPI number and an allocated bandwidth thereof or output time slot allocation.

A feature of the method of the present invention is that a traffic load for a cross connect at the next stage may be uniformed because allocated bandwidth are regulated.

FIG. 7 is a diagram showing another embodiment of the present invention. In the present embodiment, an acknowledgment cell which notifies that VP capacity modifying indication has been received is returned. In this case, an OAM cell having a return VPI designated value contained in the received OAM cell as a VPI is sent out in a reverse direction in an OAM cell processor. The return designated VPI value is transferred to a latter stage after being converted link by link by means of respective cross connects.

A feature of a method of the present invention is that reliability is high because it is possible to confirm that normal values have been set in all the cross connects in modification of a VP capacity.

Figure 8:
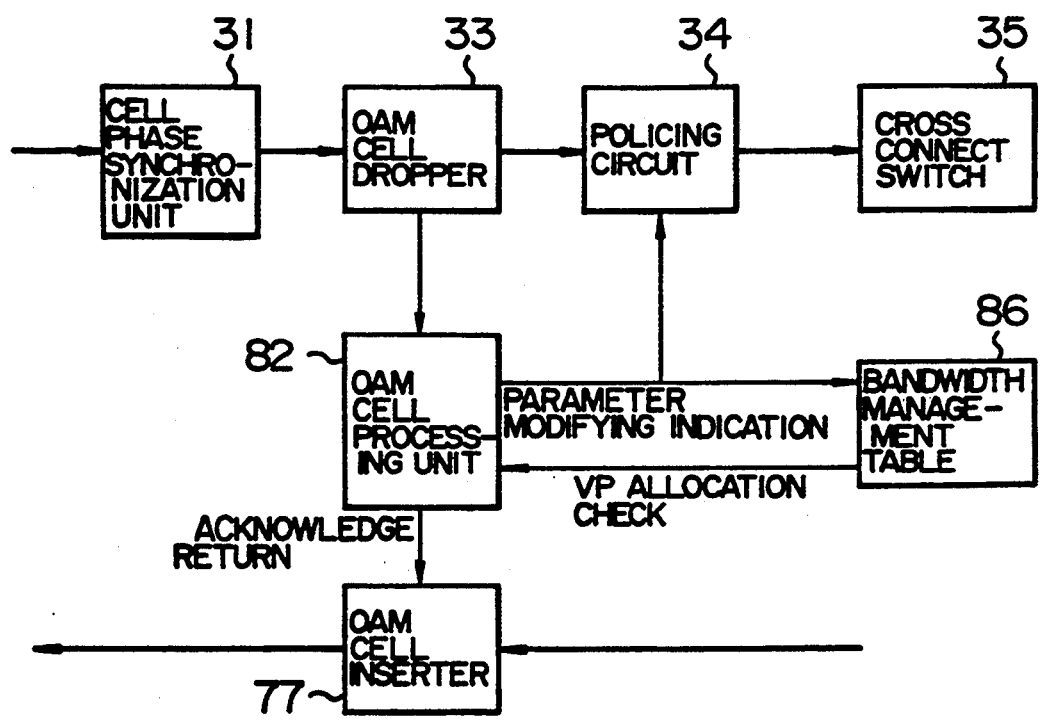
FIG. 8 is a block diagram illustrating a further embodiment of the present invention.

FIG. 8 is a diagram showing another embodiment of the present invention. In the present embodiment, it is checked whether a modified VP capacity notified with an OAM cell matches with a physical capacity of a transmission line, and the check result is returned with an acknowledgment cell.

A feature of the method of the present embodiment is that reliability is high because a set value is not only confirmed, but also the correctness thereof is verified independently at respective cross connects.

Figure 9:
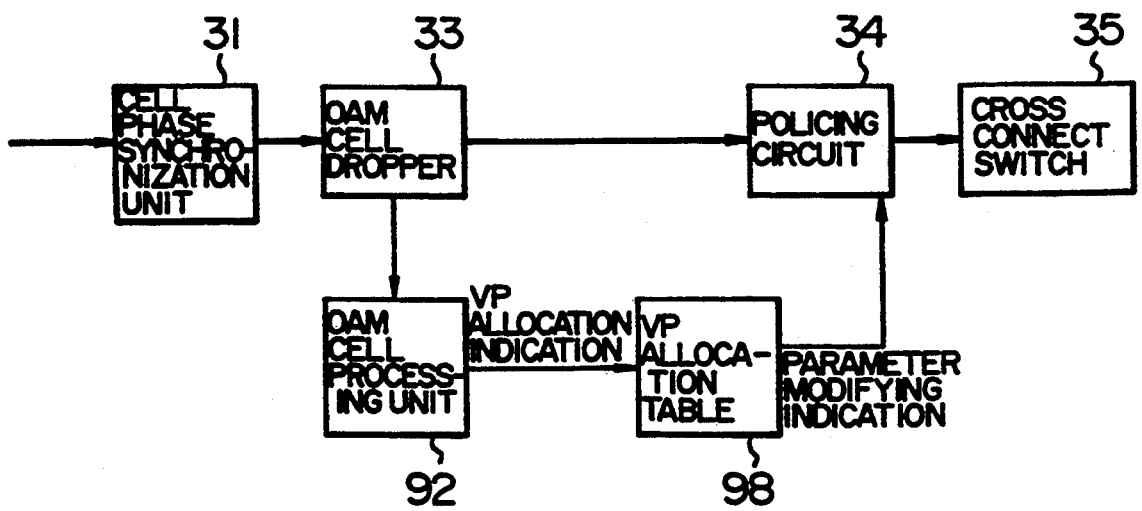
FIG. 9 is a block diagram illustrating a still further embodiment of the present invention.

FIG. 9 is a diagram showing another embodiment of the present invention. In the present embodiment, the capacity of each individual VP is not modified one by one, but change-over indicating information of the virtual path setting tables held by respective cross connects is sent out, thereby to modify a plurality of VP's with one OAM cell.

According to the method of the present invention, it is possible to modify a plurality of VP capacities with one OAM cell. Hence, a feature of the method is that the modification process are simplified.

A case of notifying VP modifying information from a switching system has been described in all of above-described embodiments. However, a similar method is also applicable to case of notification from the VP management system.

As described in the embodiments above, according to the method of the present invention, such an effect is produced that it is possible to notify of VP capacity modification covering even several ten nodes by only one OAM cell.

We claim:

1. An apparatus, coupled to a communication network, for modifying a virtual path capacity in the communication network which transfers communication cells in an asynchronous transfer mode, each of said communication cells having a virtual path identifier indicative of a virtual path which said communication cell passes through, comprising:
   means for receiving a control cell from a first line of said communication network through said virtual path and passing said control cell to a second line of said communication network along said virtual path, said control cell having control information indicative of a modification to be made to a bandwidth of the virtual path and a virtual path identifier same as that of said communication cell; and
   means for modifying a bandwidth allocated to the virtual path in accordance with the control information of said control cell.

2. A method of modifying a virtual path capacity in a communication network having a plurality of cross connect apparatuses along the virtual path between two end switching apparatuses, said method comprising the steps of:

sending out a control cell in an asynchronous transfer mode from one of said two end switching apparatuses to a link along a virtual path already established whose capacity is requested to be modified, said control cell including an identifier indicative of said virtual path and an indication for notifying the modification of capacity of the virtual path;

modifying at each of said cross connect apparatuses a control parameter for defining the capacity of said virtual path upon receiving said control cell; and relaying said control cell to a next link along the virtual path by each of said cross connect apparatuses that received said control cell.

3. A method of modifying a virtual path capacity according to claim 2, further comprising the step of:

returning an acknowledge cell having information of confirmation of reception of said control cell from each of said cross connect apparatuses toward said one of said two end switching apparatuses.

4. A method of modifying a virtual path capacity according to claim 2, further comprising the step of:

modifying at each of said cross connect apparatuses a control parameter for regulating input cells to be transmitted through said virtual path, upon receiving said control cell.

5. A method of modifying a virtual path capacity according to claim 2, further comprising the step of:

judging whether or not said modification of capacity of said virtual path is acceptable for each of said cross connect apparatuses upon receiving said control cell.

6. A method of modifying a virtual path capacity according to claim 5, further comprising the step of:

returning a cell having information to notify the result of said judgement from one of said cross connect apparatuses toward said one of said two end switching apparatuses.

7. A method of modifying a virtual path capacity according to claim 2, further comprising the step of:

modifying at each of said cross connect apparatuses a control parameter for shaping the traffic of input cells to be transmitted through said virtual path, upon receiving said control cell.

8. A node switching apparatus for forming a part of a virtual path for an asynchronous transfer mode communication network between two end switching apparatuses, comprising:

means for relaying an input communication cell along a virtual path designated by an identifier of the communication cell indicative of one of a plurality of virtual paths;

means for regulating a transmission capacity of input communication cells for each virtual path according to regulation parameters; and means for modifying at least a part of said regulation parameters upon receiving a control cell from upstream side of one of said plurality of virtual paths, said control cell being transmitted from one of said end switching apparatuses to said one virtual path and including an identifier indicative of said one virtual path and an indication for notifying the modification of capacity of said one virtual path.

9. A node switching apparatus according to claim 8, further comprising:

means for returning an acknowledge cell having information of confirmation of reception of said control cell toward said one of said end switching apparatuses after receiving said control cell.

10. A node switching apparatus according to claim 8, further comprising:

means for judging whether or not the modification of capacity of said one virtual path requested by said control cell is acceptable for the node switching apparatus.

11. A node switching apparatus according to claim 8, further comprising:

means for modifying a control parameter for shaping the traffic of input cells for each virtual path upon receiving said control cell.

12. A communication system for performing communication between a pair of switching apparatuses through communication cells in asynchronous transfer mode, said communication cells transmitted via a plurality of connect nodes connected link by link along a virtual path, wherein:

each of said switching apparatuses includes means for sending out a control cell in asynchronous transfer mode to a line forming a part of a virtual path whose capacity is intended to be modified, said control cell including an identifier indicative of said virtual path and an indication for requesting the modification of capacity of said virtual path; and each of said connect nodes comprises:

means for regulating a transmission capacity of input communication cells for each of a plurality of virtual paths according to regulation parameters; and means for modifying at least a part of said regulation parameters upon receiving said control cell from upstream side of one of said virtual paths.

13. A communication system according to claim 12 wherein each of said connect nodes further comprises:

means for returning an acknowledge cell having information of confirmation of reception of said control cell toward said one of said switching apparatuses after receiving said control cell.

14. A communication system according to claim 12, wherein each of said connect nodes further comprises:

means for judging whether or not the modification of capacity of said virtual path requested by said control cell is acceptable for the connect node.

15. A communication system according to claim 12, wherein each of said connect nodes further comprises:

means for shaping the traffic of communication cells for each virtual path based on a control parameter; and means for modifying a part of said control parameter corresponding to a virtual path specified by said control cell upon receiving the control cell.

* * * * *